(12) United States Patent  (10) Patent No.: US 11,393,366 B2
Qian  (45) Date of Patent: Jul. 19, 2022

(54) PROJECTION CALIBRATIONS

(71) Applicant: Hewlett-Packard Development Company, L.P., Spring, TX (US)

(72) Inventor: Xiangfei Qian, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/614,585

(22) PCT Filed: Jul. 11, 2017

(86) PCT No.: PCT/US2017/041438
§ 371 (c)(1),
(2) Date: Nov. 18, 2019

(87) PCT Pub. No.: WO2019/013758
PCT Pub. Date: Jan. 17, 2019

(65) Prior Publication Data
US 2020/0126462 A1  Apr. 23, 2020

(51) Int. Cl.
*G09G 3/00* (2006.01)
*G06F 3/041* (2006.01)
*H04N 9/31* (2006.01)

(52) U.S. Cl.
CPC ........... *G09G 3/002* (2013.01); *G06F 3/0418* (2013.01); *H04N 9/3185* (2013.01);
(Continued)

(58) Field of Classification Search
CPC ........... G09G 3/002; G09G 2320/0693; G09G 2360/14; G06F 3/0418; H04N 9/3185; H04N 9/3194
(Continued)

(56) References Cited

U.S. PATENT DOCUMENTS 8,400,468 B2  3/2013 Nelson
8,542,267 B1  9/2013 Trott et al.
(Continued)

FOREIGN PATENT DOCUMENTS

CN  103942796  7/2014
WO  WO 2016/036370  * 9/2014
(Continued)

OTHER PUBLICATIONS

Lee, Johnny C. et al. "Automatic Projector Calibration with Embedded Light Sensors." In Proc of the 17th Annual ACM Symposium on User Interface Software and Tech, Apr. 2004, pp. 123-126.

*Primary Examiner* — Chanh D Nguyen
*Assistant Examiner* — Ngan T. Pham-Lu
(74) *Attorney, Agent, or Firm* — Rahman LLC

(57) ABSTRACT

An example calibration device includes a projector projecting a first light region including a first area onto and extending over a border of a non-patterned touch mat. A camera captures a first image of the first light region. A processor establishes a first set of four corner coordinates of the touch mat. The projector projects a second light region including a second area onto the touch mat. The second area is smaller than the first area. The camera captures a second image of the second light region. The processor performs a perspective transformation of the second image using the first set of corner coordinates and a resolution of the second light region to get a second set of four corner coordinates of the touch mat in a coordinate plane of the projector. The processor aligns the first and second set of four corner coordinates.

13 Claims, 11 Drawing Sheets

(52) U.S. Cl.
CPC ... *H04N 9/3194* (2013.01); *G09G 2320/0693* (2013.01); *G09G 2360/14* (2013.01)

(58) Field of Classification Search
USPC .......................................................... 345/173
See application file for complete search history.

(56) References Cited

U.S. PATENT DOCUMENTS

| | | |
|---|---|---|
| 9,551,916 B2 | 1/2017 | Magie et al. |
| 9,659,371 B2 | 5/2017 | Scharfenberger et al. |
| 2004/0061838 A1* | 4/2004 | Mochizuki ........... H04N 9/3194 353/69 |
| 2006/0192925 A1* | 8/2006 | Chang .................. H04N 9/3147 353/94 |
| 2014/0139717 A1* | 5/2014 | Short .................. G06F 3/03542 348/333.1 |
| 2015/0156467 A1* | 6/2015 | Ouchi ...................... H04N 9/07 348/745 |
| 2016/0316186 A1* | 10/2016 | Krishnakumar ..... G06K 9/6201 |
| 2016/0334938 A1 | 11/2016 | Kang et al. |
| 2016/0378258 A1 | 12/2016 | Lyons et al. |
| 2017/0083157 A1* | 3/2017 | Vice ..................... H04N 9/3185 |

FOREIGN PATENT DOCUMENTS

| | | | |
|---|---|---|---|
| WO | WO-2016007167 | | 1/2016 |
| WO | WO 2016/018393 | * | 2/2016 |
| WO | WO-2016036370 | | 3/2016 |

* cited by examiner

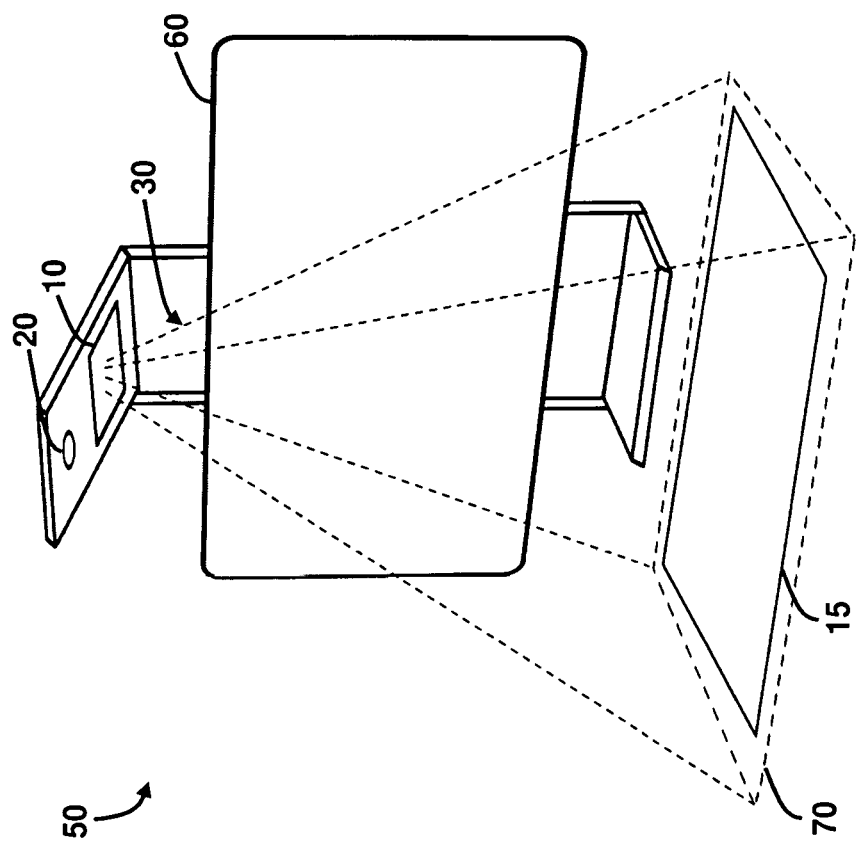

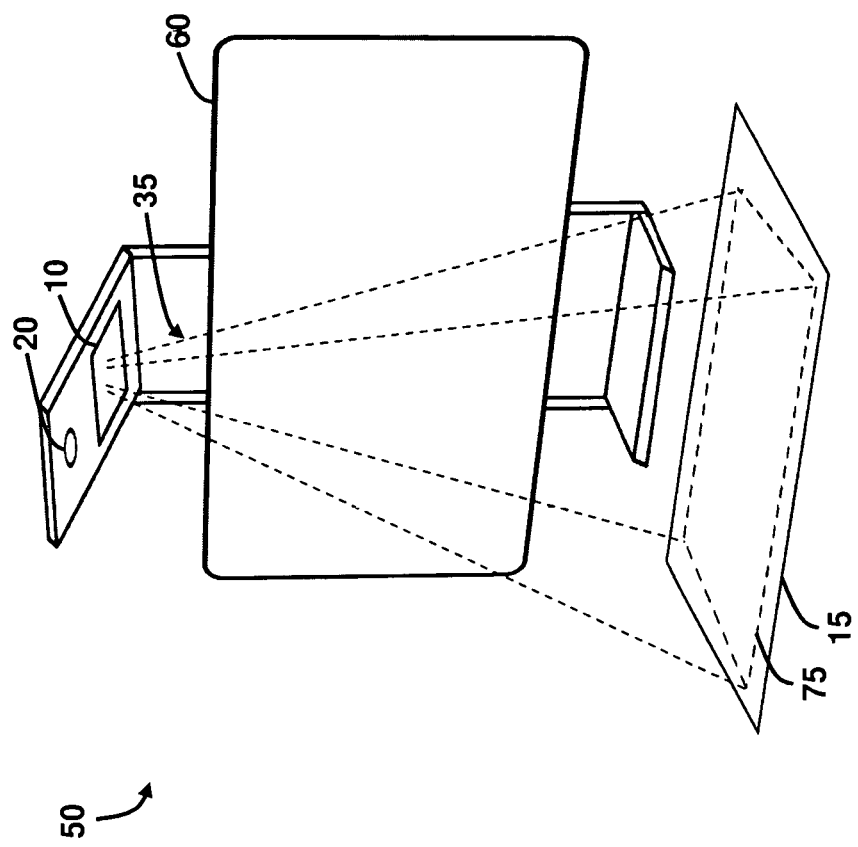

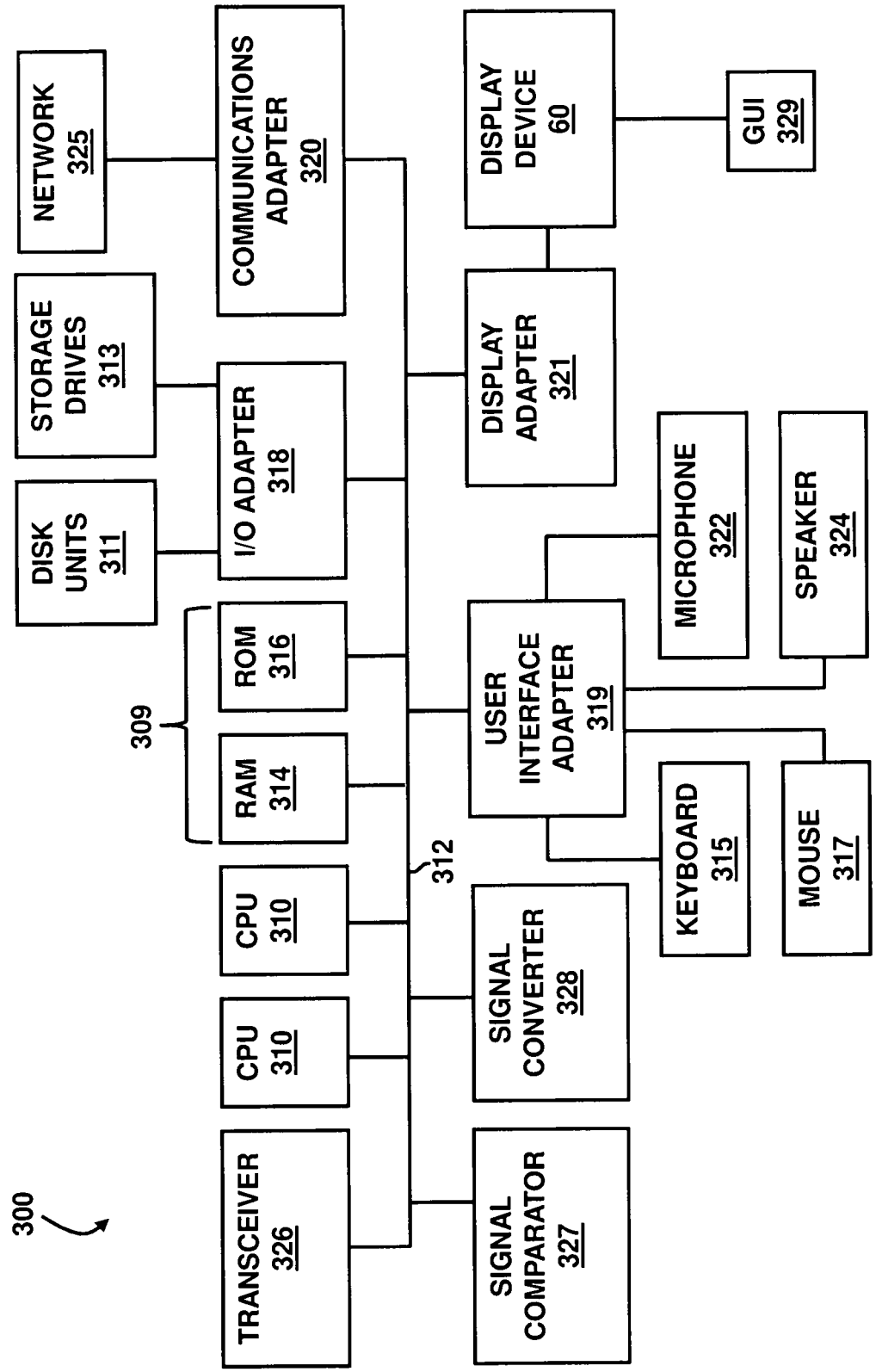

PROJECTION CALIBRATIONS

BACKGROUND

Computer systems incorporating projectors project images onto display areas. The images are aligned to the display areas. The type of display areas can vary as well as the quality of the projected images.

BRIEF DESCRIPTION OF THE DRAWINGS

FIG. 3A is a perspective view illustrating the system with a projected first light region, according to an example.

FIG. 4A is a perspective view illustrating a system with a projected second light region, according to an example.

FIG. 8 is a block diagram illustrating a computer system, according to an example.

DETAILED DESCRIPTION

Computer systems incorporating projectors project images onto a touch mat whereby the mat is used as a secondary display area apart from the traditional display monitor, and substitutes for a traditional keyboard and mouse. Projectors are set to project the image as clearly and accurately as possible onto the mat.

The examples described herein provide a vision-based calibration technique for a projector that is attached to a computer to properly align with a touch mat. The calibration technique aligns the projector's projection area to the touch mat area in an automated manner without requiring interaction by a user. There are eight parameters which the projector uses for calibration/adjustment purposes: the X and Y coordinates of each of the four corners of the projection area. The calibration technique results in the projector's images being confined to the area of the touch mat thereby eliminating unused space on the touch mat or overextension of projected images on the touch mat. The examples described below further utilize white light in specified geometric configurations to perform the calibration process.

Figure 1:
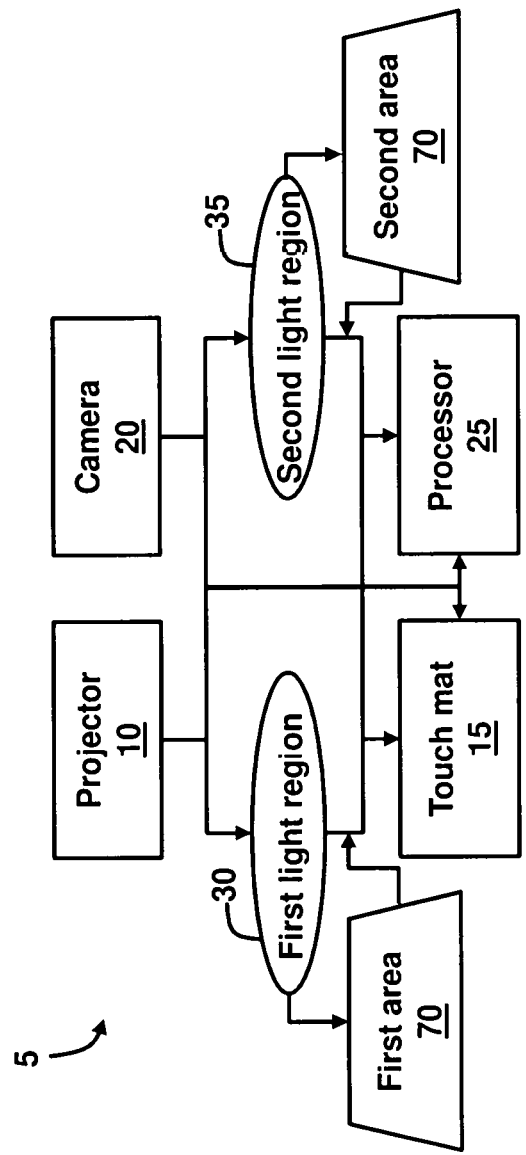
FIG. 1 is a schematic diagram illustrating a calibration device, according to an example.

FIG. 1 is a schematic diagram illustrating a calibration device 5, according to an example. The calibration device 5 comprises a projector 10, a camera 20, and a processor 25. To perform the calibration technique, a clean and empty touch mat 15 is first provided. The touch mat 15 has no discernable patterns on its surface and any suitably sized touch mat 15 may be used. In one example, the touch mat 15 may be 24"×16". The projection area of the projector 10 is resized to a default size. In one example, the default size may be the largest size that the projector 10 may project. At a minimum, the default projection area covers the entire area of the touch mat 15. The projector 10 projects a first light region 30 comprising a first area 70 onto and extending over a border of the non-patterned touch mat 15. In this regard, the projector 10 may project multiple flashes of light within a few seconds. In one example, the projector 10 flashes white light for approximately 2-3 seconds. The flashing of the light may occur as a continuous stream of light for the entire duration or may be projected in a strobe-like manner in rapid succession for the approximately 2-3 seconds. The camera 20 captures a first image of the first light region 30. The exposure of the camera 20 may be set to a relatively high resolution; e.g., set to an exposure value of 800, in one example. A processor 25 establishes a first set of four corner coordinates of the touch mat 15. The processor 25 may utilize a corner detection technique on the flashed image to acquire the first set of four corner coordinates of the touch mat 15. Any suitable corner detection technique may be utilized in accordance with the examples herein. The processor 25 may then calculate a first homography matrix using the detected corners and the size of the outputted perspective projection; e.g., first area 70. Multiple homography matrices associated with different resolution sizes may be computed. For example, the resolution sizes may be 4200×2800, 1920×1280, and 1050×700.

Next, the projector 10 projects a second light region 35 comprising a second area 75 onto the touch mat 15, wherein the second area 75 is smaller than the first area 70. In one example, the processor 25 confines the second area 75 within the borders of the touch mat 15. The projector 10 is set to project a white screen. Similar to the projection of the first light region 30, the projector 10 may project multiple flashes of light for a few seconds. In one example, the projector 10 flashes white light for approximately 2-3 seconds. The flashing of the light may occur as a continuous stream of light for the entire duration or may be projected in a strobe-like manner in rapid succession for the approximately 2-3 seconds. The size of the second area 75 may be 10% smaller than the size of the first area 70, in one example. More specifically, each of the top, bottom, left, and right side margins of the second area 75 may be 10% smaller than the corresponding top, bottom, left, and right side margins of the first area 70. For example, if the resolution size of the first area 70 is 4200×2800, then the resolution size of the second area 75 is 3780×2520. The camera 20 captures a second image of the second light region 35.

The processor 25 may remove portions of the second image extending beyond the second light region 35. For example, the processor 25 may crop the second image so that the cropped image covers the projected second light region 35, but not all of the four corners of the touch mat 15 are visible to the camera 20. The processor 25 may calculate a second homography matrix using the detected corners and the actual resolution of the white screen projection in the projector 10.

Thereafter, the processor 25 performs a perspective transformation of the second image using the first set of corner coordinates and a resolution of the second light region 35 to get a second set of four corner coordinates of the touch mat 15 in a coordinate plane of a projector 10. More specifically, the perspective transformation occurs using the second homography matrix and the four corner coordinates of the touch mat 15 to acquire the location of the four corners of the touch mat 15 in the coordinate plane of the projector 10. The processor 25 aligns the first set of four corner coordinates with the second set of four corner coordinates. Here, the four corners of the coordinate plane of the projector 10 are aligned to the location of the four corners of the touch mat 15 in the coordinate plane of the projector 10 computed in the perspective transformation process described above.

In an example, the processor 25 aligns the first set of four corner coordinates with the second set of four corner coordinates by calibrating a border of a projection area of the projector 10 with the border of the touch mat 15. Due to the pitch angle of the projector 10 in relation to the touch mat 15, the first area 70 and the second area 75 may be trapezoid in shape. The first light region 30 and the second light region 35 comprise white light, in one example. In other examples, other colored light may be used.

Figure 2A:
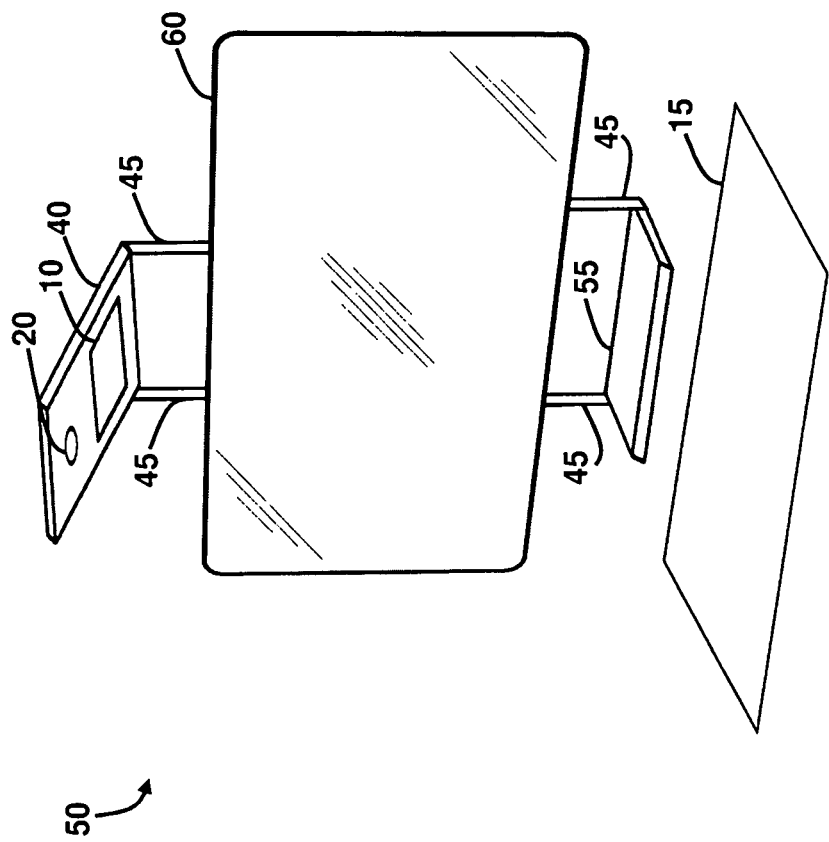
FIG. 2A is a perspective view illustrating a system, according to an example.

FIG. 2A, with reference to FIG. 1, is a perspective view illustrating a system 50, according to an example. The system 50 comprises a display screen 60 connected to a frame 45. The display screen 60 may be a touch display, in one example. The frame 45 is positioned on the back side of the display screen 60 to permit a non-obstructed view of the contents displayed on the display screen 60. The frame 45 is supported by a base 55. The touch mat 15 is positioned in front of the base 55 and substantially transverse to the position of the display screen 60. For example, the touch mat 15 and base 55 may be positioned on a desk or table top, which is not shown in the drawings. The frame 45 extends upwardly from the base 55, and in one example, the frame 45 may be angularly configured in a tapered manner. A housing unit 40 connects to the top of the frame 45 and is angled with respect to the display screen 60 whereby the housing unit 40 and the touch mat 15 are not parallel to one another, in one example. The housing unit 40 comprises the projector 10 and camera 20. In an example, the housing unit 40 may comprise multiple cameras 20. While not shown in the drawings, the housing unit 40 may also comprise a three-dimensional, 3D, scanner. The touch mat 15 is positioned to receive and display projected displays, images, and light, including the first light region 30 and the second light region 35 from the projector 10.

Figure 2B:
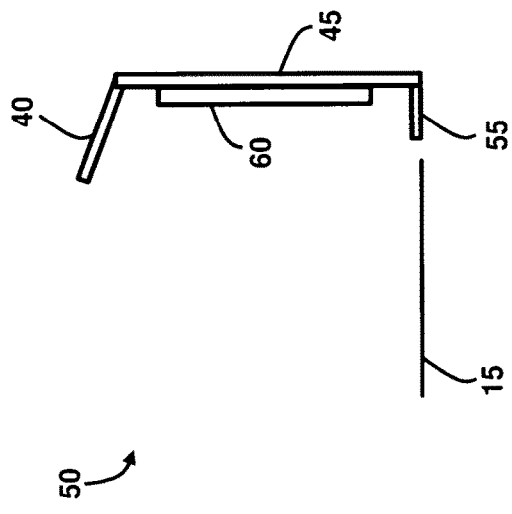
FIG. 2B is a side view illustrating the system of FIG. 2A, according to an example.

FIG. 2B, with reference to FIGS. 1 and 2A, is a side view illustrating the system 50 of FIG. 2A, according to an example. Here, the pitch angle of the housing unit 40 is more readily noticeable. The housing unit 40, which houses the projector 10 and camera 20, comprises a pitch angle relative to the frame 45 and the display screen 60 to allow for the projections to be properly displayed on the touch mat 15. In this regard, if the housing unit 40 did not have a pitch angle, and instead was aligned perpendicular to the frame 45 and parallel to the touch mat 15, then the images, displays, and lights projected by the projector 10 towards the touch mat 15 would fail to completely fill the full area of the touch mat 15, leaving most of the projections substantially unviewable. As mentioned above, it is the pitch angle of the housing unit 40 that renders the first area 70 and second area 75 to appear trapezoidal in shape, and it is the pitch angle that renders the utility of the calibration process provided by the examples herein to allow the projections from the projector 10 to be aligned with the touch mat 15.

Figure 2D:
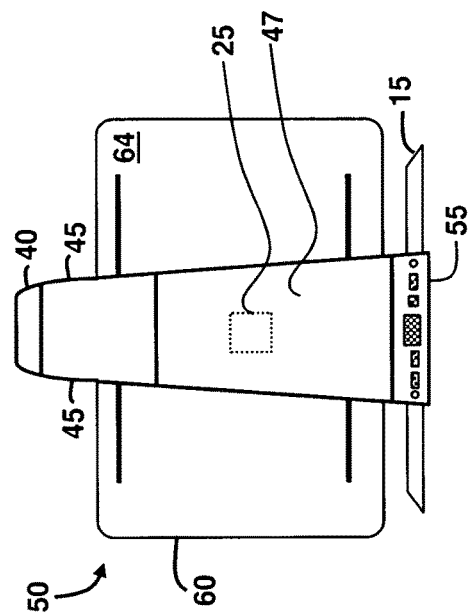
FIG. 2D is a rear view illustrating the system of FIG. 2A, according to an example.
Figure 2C:
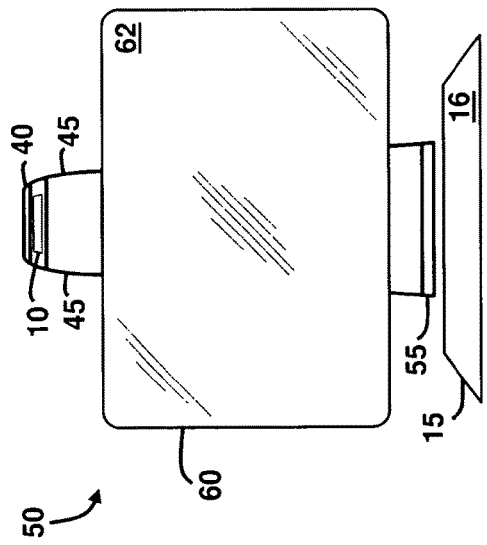
FIG. 2C is a front view illustrating the system of FIG. 2A, according to an example.

FIG. 2C, with reference to FIGS. 1 through 2B, is a front view illustrating the system 50 of FIG. 2A, according to an example. The display screen 60 comprises a front surface 62 that displays content and images. The touch mat 15 comprises an unpatterned upper surface 16 that may project the same images and content displayed on the display screen 60, in one example. Alternatively, the touch mat 15 may display other images and content that are different than the content shown on the display screen 60. The upper surface 16 of the touch mat 15 may hold an object that the camera 20 takes a picture of or that the 3D scanner, not shown, takes a 3D scan of, and the touch mat 15 may be manipulated by an electronic active pen or stylus, not shown in the drawings.

FIG. 2D, with reference to FIGS. 1 through 2C, is a rear view illustrating the system 50 of FIG. 2A, according to an example. The display screen 60 comprises a rear surface 64, whereby the frame 45 is attached to the display screen 60 on the rear surface 64 to properly hold the display screen 60 in place. The processor 25 may be housed within the frame body 47 such that the processor is operatively connected to and in communication with the projector 10, touch mat 15, camera 20, and display screen 60, among other components of the system 50.

FIG. 3A, with reference to FIGS. 1 through 2D, is a perspective view illustrating the system 50 with a projected first light region 30, according to an example. As shown, the projector 10 projects the first light region 30 in a default size setting of the projector 10, which is larger than the area of the touch mat 15. The first light region 30 is displayed as first area 70, which is shown to be a trapezoid in shape, according to one example.

Figure 3B:
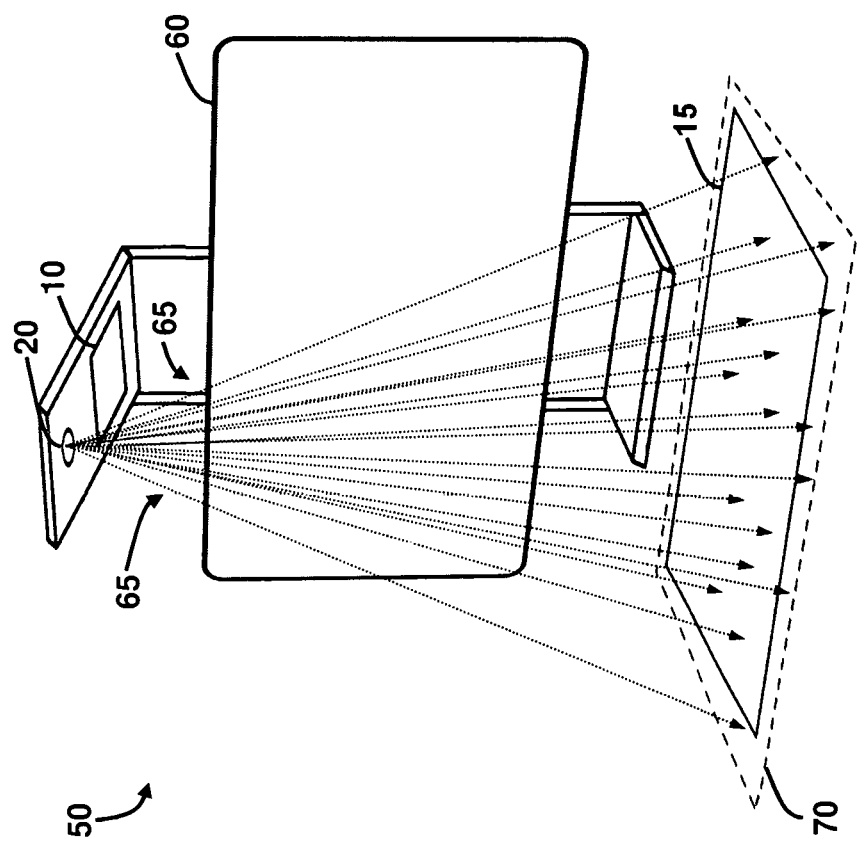
FIG. 3B is a perspective view illustrating the system of FIG. 3A with images being captured, according to an example.

FIG. 3B, with reference to FIGS. 1 through 3A, is a perspective view illustrating the system 50 of FIG. 3A with images 65 being captured, according to an example. After the projector 10 projects the first light region 30 as first area 70, as described above with respect to FIG. 3A, the camera 20 captures an image(s) 65 of the first area 70, as indicated in FIG. 3B.

FIG. 4A, with reference to FIGS. 1 through 3B, is a perspective view illustrating the system 50 with a projected second light region 35, according to an example. As shown, the projector 10 projects the second light region 35 in an area within the borders of the touch mat 15. The second light region 35 is displayed as second area 75, which is shown to be a trapezoid in shape, according to one example, and which may be approximately 10% smaller than the first area 70.

Figure 4B:
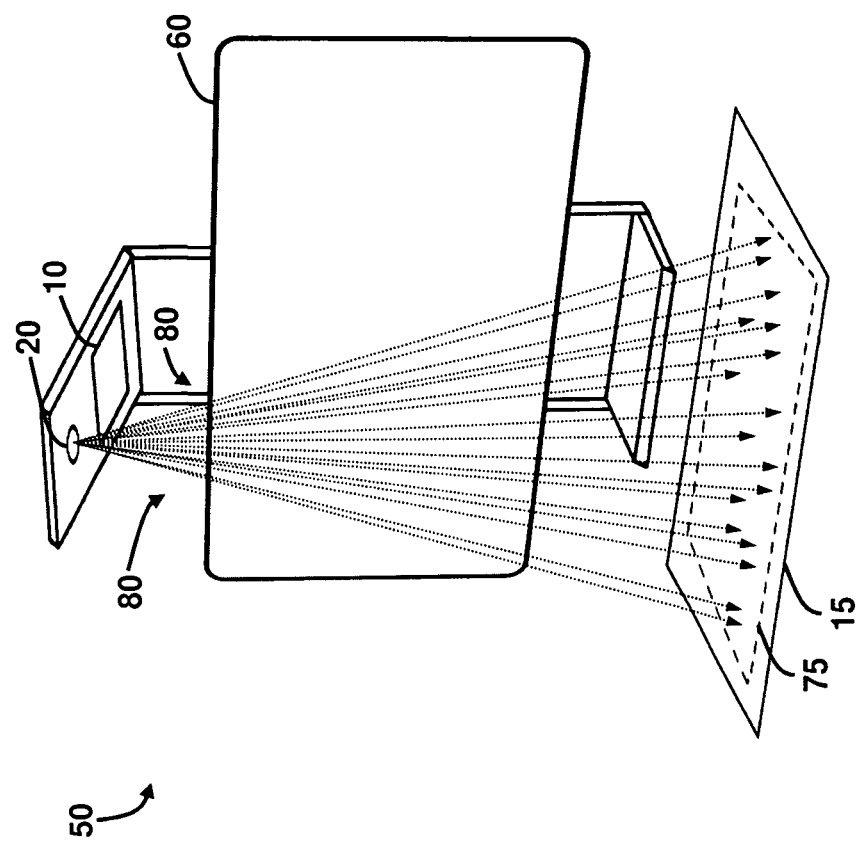
FIG. 4B is a perspective view illustrating the system of FIG. 4A with images being captured, according to an example.

FIG. 4B, with reference to FIGS. 1 through 4A, is a perspective view illustrating the system 50 of FIG. 4A with images 80 being captured, according to an example. After the projector 10 projects the second light region 35 as second area 75, as described above with respect to FIG. 4A, the camera 20 captures an image(s) 80 of the second area 75, as indicated in FIG. 4B.

Figure 5:
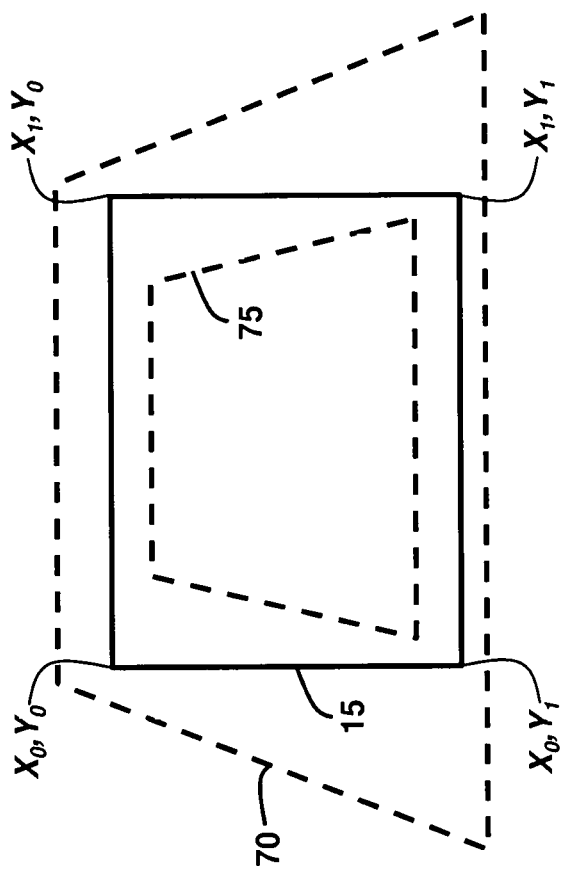
FIG. 5 is a schematic diagram illustrating the first and second areas of the respective first and second projected light regions relative to a touch mat, according to an example.

FIG. 5, with reference to FIGS. 1 through 4B, is a schematic diagram illustrating the first and second areas 70, 75 of the respective first and second projected light regions 30, 35 relative to the touch mat 15, according to an example. FIG. 5 illustrates a substantially top view of the touch mat 15 and the corresponding first and second areas 70, 75. The four corners of the touch mat 15, as described above, are also depicted in FIG. 5 with respect to their coordinate positions: $X_0$, $Y_0$; $X_1$, $Y_0$; $X_0$, $Y_1$; and $X_1$, $Y_1$. The calibration techniques utilize these coordinate positions as described in the examples herein to align the coordinate plane of the projector 10 with the touch mat 15 to properly display the projected images onto the touch mat 15.

Figure 6:
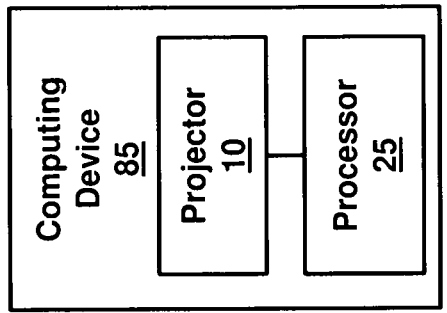
FIG. 6 is a block diagram illustrating a computing device, according to an example.

FIG. 6, with reference to FIGS. 1 through 5, is a block diagram illustrating a computing device 85 according to an example. The computing device 85 comprises the projector 10 of the calibration device 5 and system 50 whereby the projector 10 projects light onto the non-patterned touch mat 15. The computing device 85 comprises the processor 25 of the calibration device 5 and system 50, which is operatively connected to the projector 10. The projector 10 projects light to define a first projection size 70 onto the touch mat 15, and projects light to define a second projection size 75 onto the touch mat 15. The projector 10 detects four corners of the first projection size of light 70 and the second projection size of light 75, performs a perspective transformation of the second projection size of light 75 using the detected four corners of the first projection size of light 70 and a resolution of the second projection size of light 75, and aligns the four corners of the first projection size of light 70 with the four corners of the second projection size of light 75. In an example, the first projection size of light 70 is larger than the second projection size of light 75. In an example, the computing device 85 comprises the camera 20 of the calibration device 5 and system 50 whereby the camera 20 captures images 65, 80 of the first projection size of light 70 and the second projection size of light 75, respectively. The processor 25 calibrates the projector 10 to focus light within the boundaries of the touch mat 15 based on the aligned four corners of the first projection size of light 70 with the corners of the second projection size of light 75.

Various examples herein can include both hardware and software elements. The examples that are implemented in software include but are not limited to, firmware, resident software, microcode, etc. Other examples may comprise a computer program product configured to include a pre-configured set of instructions, which when performed, can result in actions as stated in conjunction with the methods described above. In an example, the pre-configured set of instructions can be stored on a tangible non-transitory computer readable medium or a program storage device containing software code.

Figure 7A:
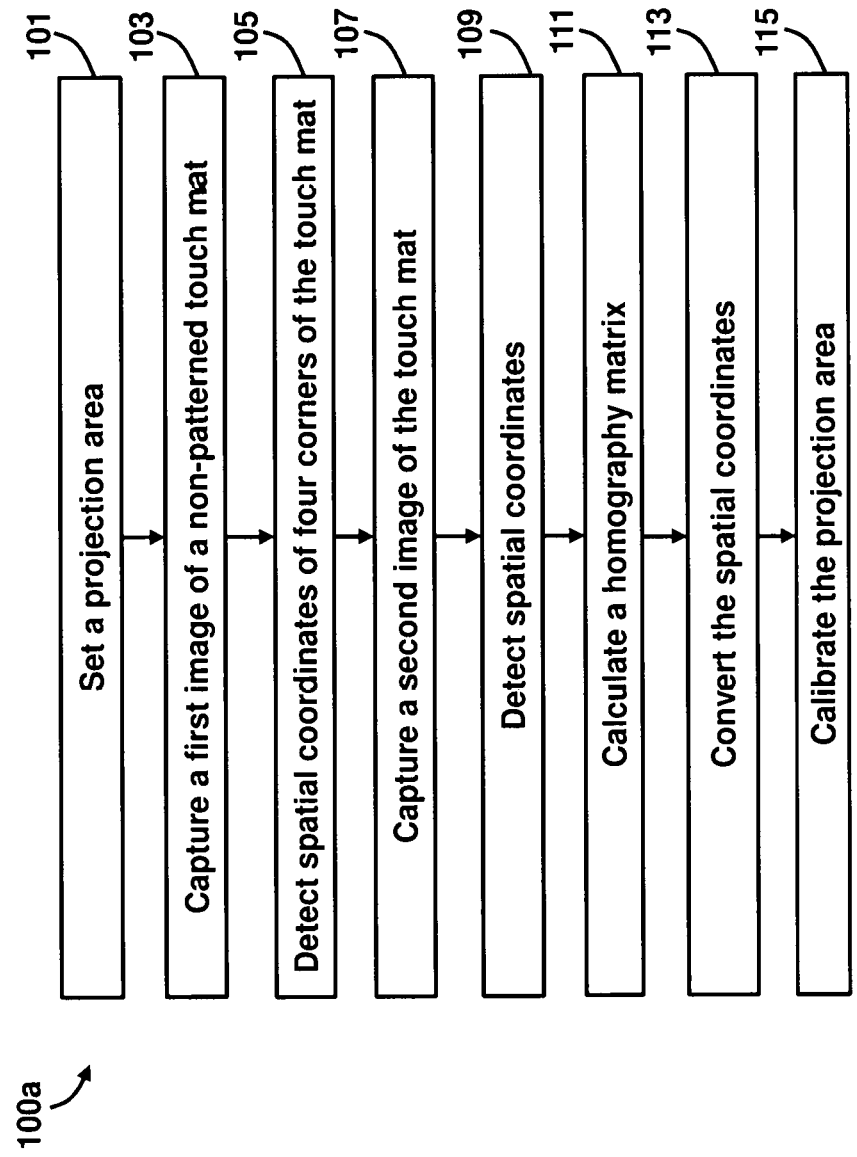
FIG. 7A is a flowchart illustrating a method, according to an example.

The non-transitory computer readable medium comprises instructions that when executed cause the processor 25 of the computing device 85 to perform a method 100a as described in the flowchart of FIG. 7A, with reference to FIGS. 1 through 6. Block 101 sets a projection area; e.g., first area 70, of the projector 10 to a size greater than a threshold. In one example, this size may be the maximum size that the projector 10 may project. Block 103 captures a first image 65 of a non-patterned touch mat 15 with light flashing thereon; e.g., the first light region 30. Block 105 detects spatial coordinates $X_0$, $Y_0$; $X_1$, $Y_0$; $X_0$, $Y_1$; and $X_1$, $Y_1$ of four corners of the touch mat 15. Block 107 captures a second image 80 of the touch mat 15, wherein the second image 80 comprises a projection size; e.g., second area 75, that is smaller than the projection area; e.g., first area 70. Block 109 detects spatial coordinates of the four corners of the second image 80. Block 111 calculates a homography matrix using the detected spatial coordinates of the four corners of the second image 80 and a resolution of the second image 80. Block 113 converts the spatial coordinates of the four corners of the second image 80 to a coordinate plane of the four corners $X_0$, $Y_0$; $X_1$, $Y_0$; $X_0$, $Y_1$; and $X_1$, $Y_1$ of the touch mat 15. Block 115 calibrates the projection area of the projector 10 to the four corners $X_0$, $Y_0$; $X_1$, $Y_0$; $X_0$, $Y_1$; and $X_1$, $Y_1$ of the touch mat 15 based on the coordinate plane.

Figure 7B:
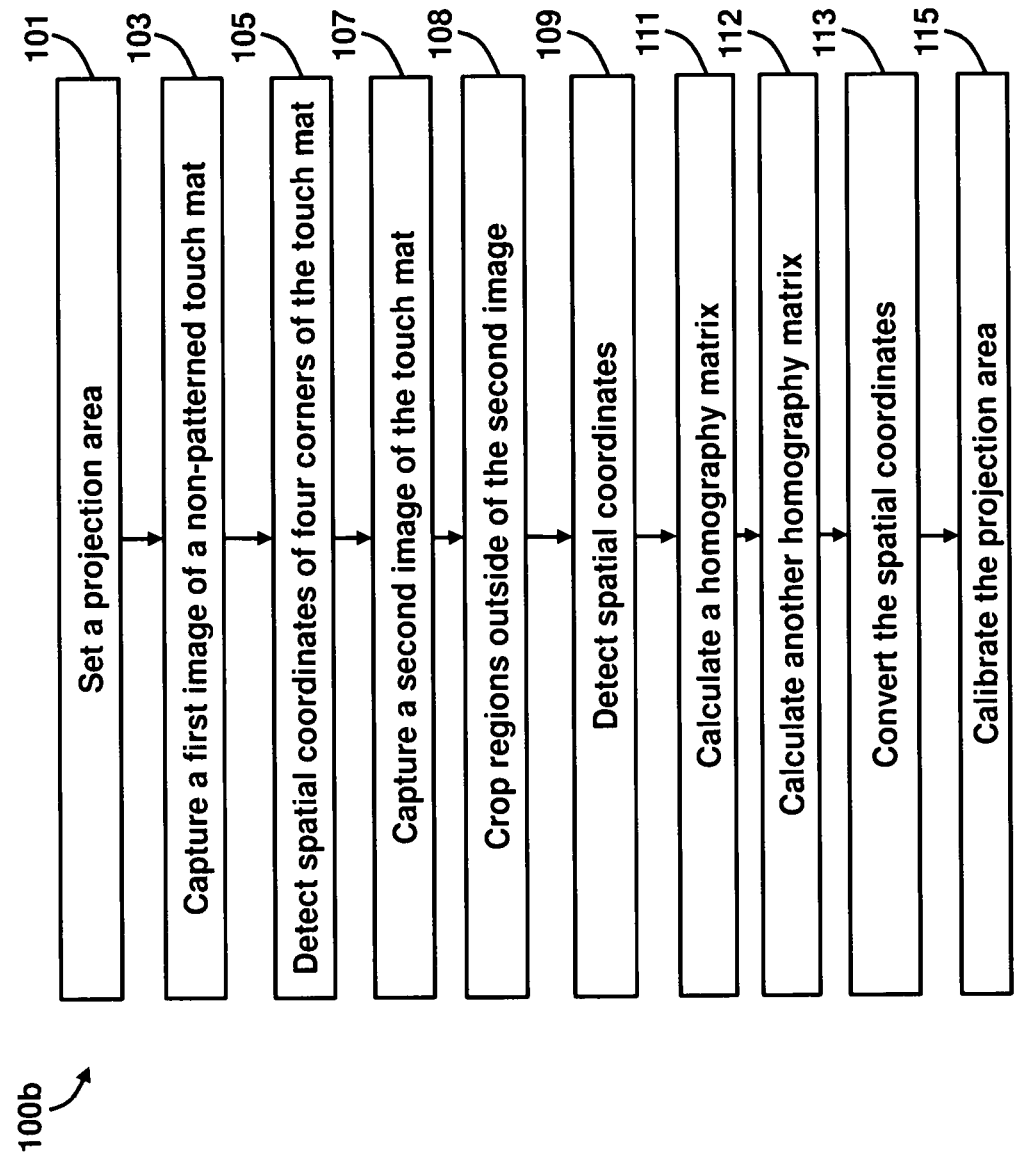
FIG. 7B is a flowchart illustrating another method, according to an example.

In one example, the non-transitory computer readable medium comprises instructions that when executed cause the processor 25 of the computing device 85 to perform a method 100b as described in the flowchart of FIG. 7B, with reference to FIGS. 1 through 7A. Method 100b is similar to method 100a described above with respect to FIG. 7A except in method 100b, block 108 is provided such that the processor 25 crops regions outside of the second image 80, according to an example. Also, in method 100b, block 112 is provided such that the processor 25 calculates another homography matrix using the detected spatial coordinates of the four corners $X_0$, $Y_0$; $X_1$, $Y_0$; $X_0$, $Y_1$; and $X_1$, $Y_1$ of the touch mat 15 and a resolution size of an outputted keystone corrected image from the projector 10. In an example, processor 25 calculates multiple homography matrices with a corresponding number of resolution sizes.

A representative hardware environment for practicing the examples herein is depicted in FIG. 8, with reference to FIGS. 1 through 7B. This block diagram illustrates a hardware configuration of an information handling/computer system 300 according to an example. The system 300 comprises at least one processor or central processing unit (CPU) 310, which may communicate with processor 25 of calibration device 5, system 50, and computing device 85 or in an alternative example, the CPU 310 may be configured as the processor 25. The CPUs 310 are interconnected via system bus 312 to at least one memory device 309 such as a RAM 314 and a ROM 316. The at least one memory device 309 can include local memory employed during actual execution of the program code, bulk storage, and cache memories which provide temporary storage of at least some program code in order to reduce the number of times code must be retrieved from bulk storage during execution. In one example, the at least one memory device 309 may store the homography matrices, images 65, 80, and calculations performed by the processor 25 for subsequent retrieval and processing by the processor 25.

In FIG. 8, an I/O adapter 318 can connect to peripheral devices, such as disk units 311 and storage drives 313, or other program storage devices that are readable by the system 300. The system 300 further includes a user interface adapter 319 that may connect the bus 312 to a keyboard 315, mouse 317, if desired to be incorporated into the system 300, speaker 324, microphone 322, and/or other user interface devices such as the touch mat 15 and the display device; e.g., display screen 60, to gather user input. Additionally, a communication adapter 320 connects the bus 312 to a data processing network 325, and a display adapter 321 connects the bus 312 to the display device 60, which may provide a graphical user interface (GUI) 329 for a user to interact with, if desired, which may be configured as a GUI on the display device; e.g., display screen 60. Further, a transceiver 326, a signal comparator 327, and a signal converter 328 may be connected to the bus 312 for processing, transmission, receipt, comparison, and conversion of electric or electronic signals, respectively.

The calibration technique described by the examples herein align the projection area of the projector 10 to the displayable area of the touch mat 15 thereby helping to eliminate unused space on the touch mat 15 when images are projected thereon and to eliminate overextension of projections beyond the touch mat area thereby resulting in unworkable or inaccessible portions of the projected image since only the image that is presented within the four corners of the touch mat 15 can be interacted with when using the touch mat 15. The calibration technique aligns the projector 10 to the touch mat 15 in an automated manner without requiring user intervention, once the calibration sequence is initiated. The initiation may occur using automatic instructions provided to the processor 25 through firmware and may occur at the initial set up of the system 50 or at any time that the processor 25 detects misalignment of the projector 10 with respect to the touch mat 15.

The present disclosure has been shown and described with reference to the foregoing exemplary implementations. Although specific examples have been illustrated and described herein it is manifestly intended that the scope of the claimed subject matter be limited only by the following claims and equivalents thereof. It is to be understood, however, that other forms, details, and examples may be made without departing from the spirit and scope of the disclosure that is defined in the following claims.

What is claimed is:

1. A calibration device for aligning a projection area on a non-patterned touch mat without user intervention, the calibration device comprising:
    a processor, automatically and without user intervention, to detect misalignment of a projector with respect to the non-patterned touch mat;
    wherein the projector is to project a first light region comprising a first area onto and extending over a border of the non-patterned touch mat;
    a camera to capture a first image of the first light region;
    wherein the processor is to establish a first set of four corner coordinates of the touch mat,
    wherein the projector is to project a second light region comprising a second area onto the touch mat, wherein the second area is smaller than the first area,
    wherein the processor is to confine the second area within the borders of the non-patterned touch mat,
    wherein the camera is to capture a second image of the second light region,
    wherein the processor, automatically and without user intervention, is to:
        remove portions of the second image extending beyond the second light region without having all four corners of the non-patterned touch mat being visible to the camera;
        perform a perspective transformation of the second image using the first set of four corner coordinates and a resolution of the second light region to get a second set of four corner coordinates of the touch mat in a coordinate plane of a projector, wherein the resolution of the second light region is different from a resolution of the first light region; and
        align the first set of four corner coordinates with the second set of four corner coordinates,
    wherein removal of the portions of the second image extending beyond the second light region and alignment of the first set of four corner coordinates with the second set of four corner coordinates eliminates unused space on the non-patterned touch mat when an image is projected thereon and eliminates overextension of projections beyond the non-patterned touch mat resulting in only the image that is presented within the four corners of the non-patterned touch mat capable of being interacted with when using the non-patterned touch mat, and wherein an alignment calibration of the projector to the non-patterned touch mat is initiated and occurs in an automated manner without requiring user intervention.

2. The calibration device of claim 1, wherein the processor is to confine the second area within the borders of the touch mat.

3. The calibration device of claim 1, wherein the second area is approximately 10% smaller than the first area.

4. The calibration device of claim 1, wherein the processor is to align the first set of four corner coordinates with the second set of four corner coordinates by calibrating a border of a projection area of the projector with the border of the touch mat.

5. The calibration device of claim 1, wherein the first area and the second area are trapezoid in shape.

6. The calibration device of claim 1, wherein the first light region and the second light region comprise white light.

7. A computing device for aligning a projection area on a non-patterned touch mat without user intervention, the computing device comprising:
    a processor, automatically and without user intervention, to detect misalignment of a projector with respect to the touch mat;
    wherein the projector is to project light onto the non-patterned touch mat in response to the automatic detection of misalignment of the projector with respect to the touch mat, and wherein the projector is to:
        project light to define a first projection size onto the touch mat; and
        project light to define a second projection size onto the touch mat;
    the processor operatively connected to the projector, wherein the processor, automatically and without user intervention, is to:
        detect four corners of the first projection size of light and the second projection size of light;
        crop portions of an image projected on the touch mat extending beyond the second light region;
        perform a perspective transformation of the second projection size of light using the detected four corners of the first projection size of light and a resolution of the second projection size of light, wherein the resolution of the second projection size of light is different from a resolution of the first projection size of light; and
        align the four corners of the first projection size of light with the four corners of the second projection size of light,
    wherein cropping of the portions of the image extending beyond the second light region and alignment of the four corners of the first projection size of light with the four corners of the second projection size of light eliminates unused space on the touch mat when a projection is projected thereon and eliminates overextension of projections beyond the touch mat resulting in only the projection that is presented within four corners of the touch mat capable of being interacted with when using the touch mat, and wherein an alignment calibration of the projector to the touch mat is initiated and occurs in an automated manner without requiring user intervention.

8. The computing device of claim 7, wherein the first projection size of light is larger than the second projection size of light.

9. The computing device of claim 7, comprising a camera to capture images of the first projection size of light and the second projection size of light.

10. The computing device of claim 7, wherein the processor is to calibrate the projector to focus light within the boundaries of the touch mat based on the aligned four corners of the first projection size of light with the corners of the second projection size of light.

11. A non-transitory computer readable medium for aligning a projection area on a non-patterned touch mat, the non-transitory computer readable medium comprising instructions that when executed cause a processor of a computing device, without user intervention, to:
- automatically and without user intervention detect misalignment of a projector with respect to the touch mat;
- set a projection area of the projector to a size greater than a threshold;
- capture a first image of the non-patterned touch mat with light flashing thereon;
- detect spatial coordinates of four corners of the touch mat;
- capture a second image of the touch mat, wherein the second image comprises a projection size that is smaller than the projection area;
- crop regions outside of the second image;
- detect spatial coordinates of the four corners of the second image;
- calculate a homography matrix using the detected spatial coordinates of the four corners of the second image and a resolution of the second image, wherein the resolution size of the second image is different from a resolution size of the first image;
- convert the spatial coordinates of the four corners of the second image to a coordinate plane of the four corners of the touch mat; and
- calibrate the projection area of the projector to the four corners of the touch mat based on the coordinate plane,
- wherein cropping regions outside of the second image and calibration of the projection area of the projector to the four corners of the touch mat based on the coordinate plane eliminates unused space on touch mat when an image is projected thereon and eliminates overextension of projections beyond the touch mat resulting in only the image that is presented within the four corners of the touch mat capable of being interacted with when using the touch mat, and wherein an alignment calibration of the projector to the touch mat is initiated and occurs in an automated manner without requiring user intervention.

12. The non-transitory computer readable medium of claim 11, comprising instructions that when executed cause the processor to calculate another homography matrix using the detected spatial coordinates of the four corners of the touch mat and a resolution size of an outputted keystone corrected image from the projector.

13. The non-transitory computer readable medium of claim 12, comprising instructions that when executed cause the processor to calculate multiple homography matrices with a corresponding number of resolution sizes.

* * * * *